US011180215B2

(12) United States Patent
Breazlan

(10) Patent No.: US 11,180,215 B2
(45) Date of Patent: Nov. 23, 2021

(54) SUSPENSION SYSTEM FOR SIDECARS

(71) Applicant: Jason Breazlan, Arbor Vitae, WI (US)

(72) Inventor: Jason Breazlan, Arbor Vitae, WI (US)

( * ) Notice: Subject to any disclaimer, the term of this patent is extended or adjusted under 35 U.S.C. 154(b) by 260 days.

(21) Appl. No.: 16/420,902

(22) Filed: May 23, 2019

(65) Prior Publication Data

US 2020/0369341 A1 Nov. 26, 2020

(51) Int. Cl.
*B62K 27/06* (2006.01)
*B62K 27/08* (2006.01)
*B62K 27/02* (2006.01)
*B62K 7/00* (2006.01)

(52) U.S. Cl.
CPC .............. *B62K 27/06* (2013.01); *B62K 27/08* (2013.01); *B62K 7/00* (2013.01); *B62K 27/02* (2013.01)

(58) Field of Classification Search
CPC .......... B62K 7/00; B62K 27/02; B62K 27/06; B62K 27/08
USPC ....................................................... 280/203
See application file for complete search history.

(56) References Cited

U.S. PATENT DOCUMENTS

| | | | | |
|---|---|---|---|---|
| 4,022,483 A | * | 5/1977 | Wallick | B62K 27/00 280/203 |
| 4,385,770 A | * | 5/1983 | Mitchell | B62K 5/10 280/203 |
| 7,487,985 B1 | | 2/2009 | Mighell | |
| 7,967,306 B2 | | 6/2011 | Mighell | |
| 8,925,940 B2 | | 1/2015 | Mighell | |
| 2010/0007109 A1 | | 1/2010 | Mighell | |
| 2011/0248463 A1 | | 10/2011 | Mighell | |
| 2013/0207363 A1 | | 8/2013 | Mighell | |
| 2015/0203154 A1 | | 7/2015 | Mighell | |

OTHER PUBLICATIONS

Harley-Davidson TRiO Kits Tilting Motor Works https://www.tiltingmotorworks.com/trio-kits-available/harley-davidson-trio-kits/.

* cited by examiner

*Primary Examiner* — Anne Marie M Boehler
*Assistant Examiner* — Felicia L. Brittman

(57) ABSTRACT

A suspension system is provided for a sidecar of a motorcycle, which includes a sidecar frame and a wheel with an axle. The suspension system can include, a support frame pivotally secured to the sidecar frame, and a trailing link pivotally secured to the support frame at a leading end of the trailing link. A trailing end of the trailing link can be configured to trail behind the leading end of the trailing link relative to a direction of forward motion of the sidecar. The trailing end of the trailing link being configured to rotatably support the axle of the wheel.

20 Claims, 4 Drawing Sheets

SUSPENSION SYSTEM FOR SIDECARS

CROSS-REFERENCE TO RELATED APPLICATIONS

Not applicable.

BACKGROUND

Sidecars enable typical motorcycles to be converted into three-wheeled vehicles, such that they can allow an additional passenger, or belongings, to travel alongside the motorcycle. In a typical configuration, sidecars have a frame that connects to a lateral side of the motorcycle frame, which allows for a fixed connection between the sidecar and the motorcycle.

SUMMARY

Some embodiments of the disclosure provide a sidecar of a motorcycle that includes a sidecar frame and a wheel with an axle. The suspension system can include a support frame pivotally secured to the sidecar frame, and a trailing link pivotally secured to the support frame at a leading end of the trailing link. A trailing end of the trailing link can be configured to trail behind the leading end of the trailing link relative to a direction of forward motion of the sidecar. The trailing end of the trailing link can be configured to rotatably support the axle of the wheel.

Other embodiments of the disclosure provide a sidecar for a motorcycle, the sidecar including a main sidecar frame, a wheel with an axle, a tilting sidecar frame pivotally secured to the main sidecar frame, and a suspension system. The suspension system can include a support frame pivotally secured to the main sidecar frame, and a trailing link pivotally secured to the support frame at a leading end of the trailing link. A trailing end of the trailing link can be configured to trail behind the leading end of the trailing link relative to a direction of forward motion of the sidecar. The trailing end of the trailing link can rotatably support the axle on opposing sides of the wheel. The suspension system can be configured to tilt with the tilting sidecar frame to tilt the wheel.

Further embodiments of the disclosure provide a sidecar for a motorcycle. The sidecar can include a wheel with an axle, a sidecar frame, and a suspension system. The suspension system can include a support frame having a first end and a second end opposite the first end. The first end of the support frame can be pivotally coupled to the sidecar frame via a ball joint, and the second end of the support frame can be pivotally coupled to the sidecar frame via a pinned connection. A pinned joint can be coupled to the support frame and a trailing link can be pivotally coupled to the pinned joint. The trailing link can have a first trailing arm that is coupled to a first mounting plate having an aperture therethrough, and a second trailing arm that is coupled to a second mounting plate having an aperture therethrough. The first trailing arm of the trailing link can be configured to extend along a first side of the wheel and the second trailing arm of the trailing link can be configured to extend along a second side of the wheel. The axle can be configured to be received through the first and the second apertures. A first shock absorber can be coupled to the first mounting plate and the support frame, and a second shock absorber can be coupled to the second mounting plate and the support frame.

A tilting system can be configured to tilt the wheel and the suspension system about an axis defined by the ball joint and the pinned connection.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Figure 1:
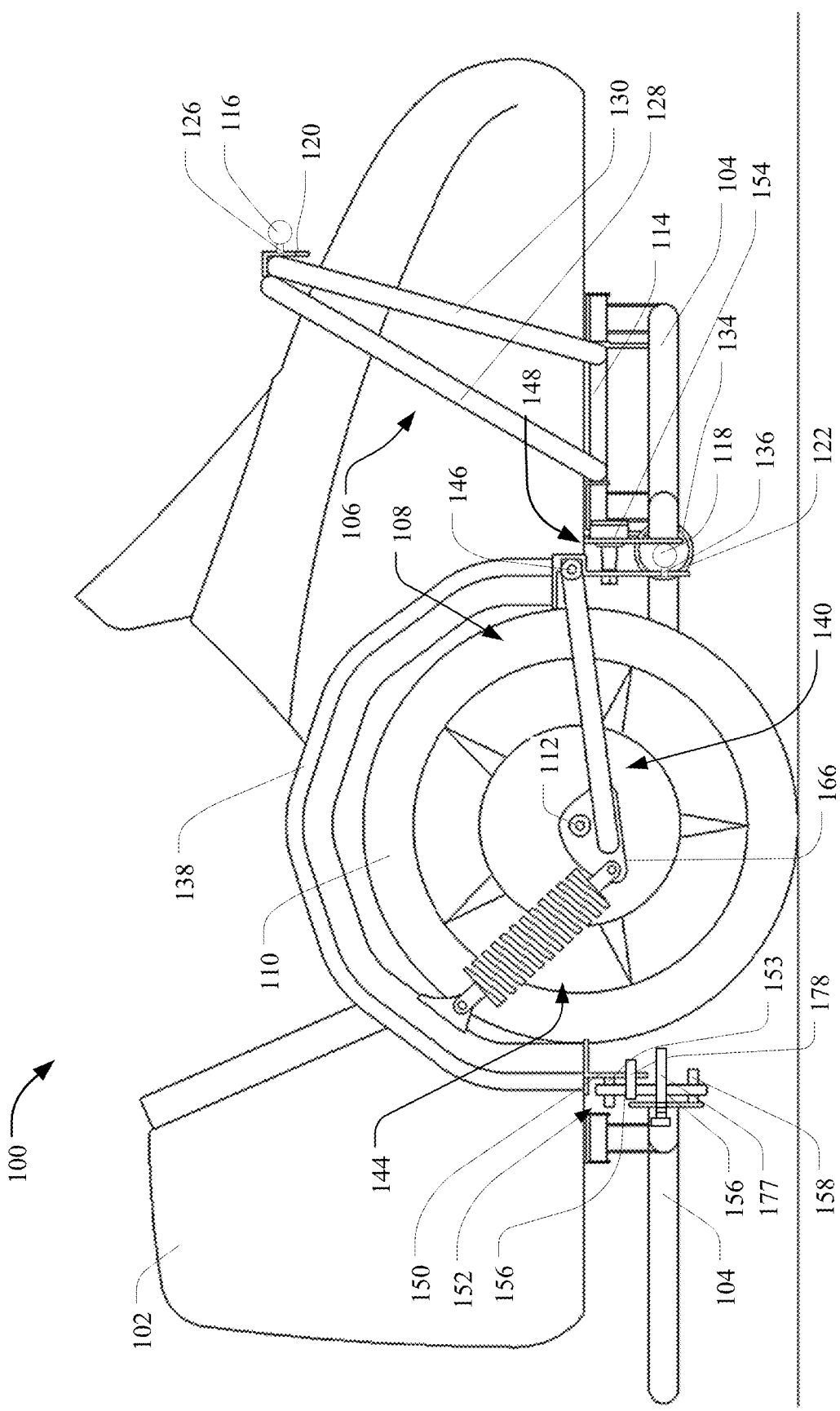
FIG. 1 is a side elevation view of a sidecar having a suspension system, according to some embodiments of the present disclosure.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As used herein, unless otherwise limited or defined, discussion of particular directions is provided by example only, with regard to particular embodiments or relevant illustrations. For example, discussion of "top," "front," or "back" features is generally intended as a description only of the orientation of such features relative to a reference frame of a particular example or illustration. Correspondingly, for example, a "top" feature may sometimes be disposed below a "bottom" feature (and so on), in some arrangements or embodiments. Further, references to particular rotational or other movements (e.g., counterclockwise rotation) is generally intended as a description only of movement relative a reference frame of a particular example of illustration.

As used herein, unless otherwise specified or limited, "at least one of A, B, and C," "at least one of A, B, or C," and similar phrases, are meant to indicate A, or B, or C, or any combination of A, B, and/or C. As such, this phrase, and similar other phrases can include single or multiple instances of A, B, and/or C, and, in the case that any of A, B, and/or C indicates a category of elements, single or multiple instances of any of the elements of the categories A, B, and/or C.

As discussed above, conventional sidecars can be used with motorcycles to increase passenger or cargo capacity. However, the fixed nature of conventional sidecar frames and attachments to motorcycles only permit a single side of the sidecar wheel to be secured. For example, generally, sidecar wheels are mounted on one side of the sidecar frame, via a fastener, similarly to wheel mountings for automobiles. This can be undesirable, as also discussed below.

Further, for similar reasons, conventional sidecars may be unable to tilt in concert with an attached motorcycle. Generally, when turning on a motorcycle (e.g., around a corner or along a curved road), a rider tilts the motorcycle. However, due to the conventional fixed mounting, conventional sidecars do not tilt when turning. This can require adjustment of riding technique and considerable skill from the motorcycle rider to ensure control of the motorcycle and sidecar collectively (e.g., by decreasing the speed of the motorcycle when turning) and can limit fully safe operation of sidecars to riders with considerable experience.

Additionally, due to the inability of the sidecar wheel to tilt, the sidecar wheel (e.g., at the mounting fasteners) and the sidecar frame may be subjected to greater forces when the sidecar wheel rolls over imperfections in the road (e.g., bumps, divots, etc.). For example, during turns, and particularly during upward and downward movement to accommodate uneven road surfaces, non-tilting sidecar wheels may cause the mounting apparatus of the sidecar wheel and other important components to be subjected to substantial and potentially imbalanced shearing and bending forces.

As another issue, the design of conventional sidecar suspension systems can also be limited by conventional configurations of connections between sidecar frames and the associated motorcycles. For example, in conventional arrangements, axles of sidecar wheels may be supported only on one side of the wheel, resulting in substantial bending forces on the axles and possible uneven wear of related components. Further, with conventional designs, shock absorbers and related suspension components may need to be installed solely on one side of the relevant wheel. This can result in significant design constraints, including due to the competing considerations of the need to provide relatively bulky components to ensure appropriate shock absorption and the need to utilize only a relatively small amount of space if a desired overall profile is to be maintained.

Embodiments of the present invention can address these or other issues. For example, some embodiments of the present disclosure can provide a tilting system that allows a sidecar wheel to tilt in the same direction as the attached tilting motorcycle. This "following" of the motorcycle by the sidecar wheel decreases the control requirements from the motorcycle rider, potentially allowing motorcycle riders of widely varying skill to sufficiently control a sidecar. In some embodiments, such a tilting system can include a trailing link to support a sidecar wheel. This may be useful, for example, in order to allow for support of an axle on both sides of the wheel as well as to generally improve response to uneven road surfaces.

In some embodiments, use of a trailing link can also help to accommodate suspension systems with decreased sizes of shock absorbers and increased overall effectiveness, as compared to conventional designs. For example, in some embodiments, a trailing link that supports an axle on opposing sides of a sidecar wheel can also support a shock absorber on each side of the wheel. This can allow for a significant reduction in size of the shock absorbers as compared to conventional arrangements. Correspondingly, embodiments of the invention can exhibit comparable mechanical damping as compared to conventional systems, with a smaller overall spatial envelope, or can exhibit larger mechanical damping with a comparable spatial envelope.

As another advantage in some embodiments, providing shock absorbers on opposing sides of a wheel can allow for better stability of the sidecar wheel than in conventional systems. For example, in the case of the single-side shock absorber, imbalance of forces on opposing sides of the wheel can subject the axle or other components to substantial bending and shearing forces.

FIG. 1 is a side elevation view of an example sidecar 100, according to some embodiments of the disclosure. The sidecar 100 includes a sidecar body 102, a sidecar frame 104, a tilting system 106, a suspension system 108, and a sidecar wheel 110 having an axle 112. As illustrated, the sidecar body 102 includes certain components or features as known in the art, such as, for example, a windshield, an enclosure supporting a seat, and an aerodynamic shape, although other configurations are possible.

The sidecar body 102 is supported by and affixed to a tilting sidecar frame 114, which is pivotally coupled to the (fixed) sidecar frame 104. The functionality of the tilting sidecar frame 114 will be further discussed below. Generally, however, the tilting sidecar frame 114 can tilt relative to the sidecar frame 104 based on the tilting of an attached motorcycle 168 (see FIG. 2), such as during turning operations.

Although a motorcycle is not depicted in FIG. 1, the sidecar frame 104 is configured to be mechanically linked to the motorcycle using conventional approaches (e.g., via welding, fasteners, pivoting connections, etc.). Additionally, as also discussed below, the sidecar frame 104 allows for other components of the sidecar 100 to be securely attached to the sidecar frame 104. In some embodiments, a fixed sidecar frame (e.g., the frame 104) can be pivotally attached to a motorcycle, such as with a pinned connection. Accordingly, for example, a fixed sidecar frame can sometimes be configured to pivot relative to a motorcycle, such that a tilt of the motorcycle during a turn may not be constrained by the sidecar frame and the sidecar frame can remain generally parallel to the relevant road surface.

Figure 2:
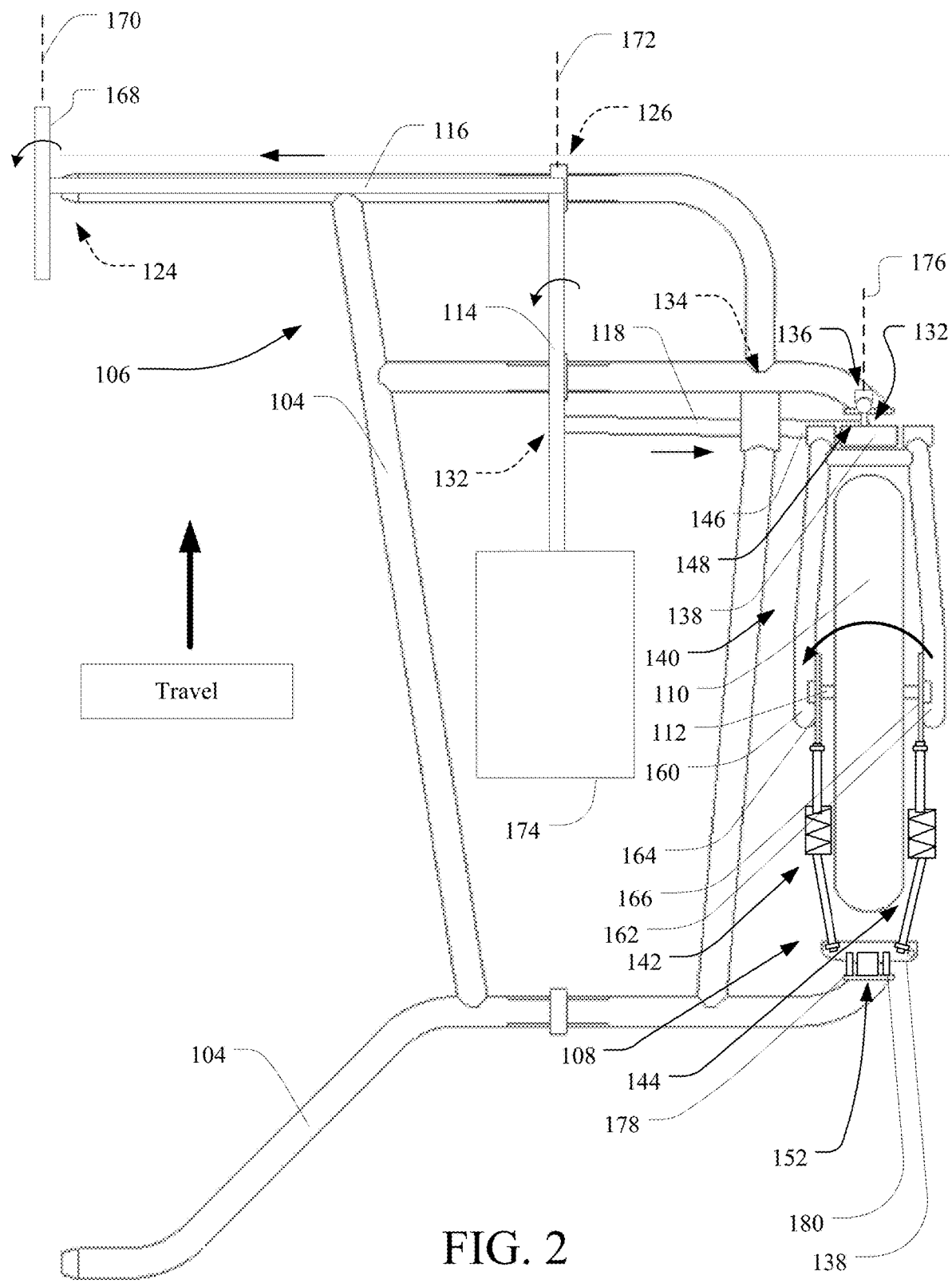
FIG. 2 is a top plan view of the sidecar of FIG. 1 with certain components removed or represented schematically for clarity of presentation.

As illustrated in FIGS. 1 and 2, the tilting system 106 includes the tilting sidecar frame 114, a motorcycle tie rod 116, a sidecar tie rod 118, a connection plate 120, and a cam plate 122 (see FIG. 1). The motorcycle tie rod 116 is coupled to a frame of the motorcycle 168 at a pinned connection 124 (see FIG. 2), and is coupled to the tilting sidecar frame 114 at a pinned connection 126 that is received through the connection plate 120 and the motorcycle tie rod 116. Each of the pinned connections 124, 126, allow rotational movement about respective, generally parallel axes (e.g., the pinned connections 124, 126 allow for rotational movement of a connected element into and out of the page, with respect to the view in FIG. 1).

As depicted in FIG. 1 in particular, the motorcycle tie rod 116 is located above the sidecar body 102, which provides enough clearance for the motorcycle tie rod 116. In some cases, the correspondingly large spacing between the motorcycle tie rod 116 and the pivoting axis of the tilting sidecar frame 114, can allow for relatively efficient transfer of tilting of the motorcycle 168 to tilting of the tilting sidecar frame 114 by the motorcycle tie rod 116 due to the decrease in force required by the motorcycle tie rod 116 to rotate the tilting sidecar frame 114. In other embodiments, however, a motorcycle tie rod can be configured in other ways, such as, for example, to extend in front of a sidecar body.

Also as shown in FIG. 1, the plate 120 is pivotally coupled to the pinned connection 126, and is welded to two arms 128, 130, which extend between the plate 120 and the tilting sidecar frame 114. Specifically the arms 128, 130, of the tilting sidecar frame 114 extend upwardly from the lower portion of the tilting sidecar frame 114 and end above the sidecar body 102. The location of the plate 120, which is coupled to the ends of the arms 128, 130, and to the pinned connection 126, allows for the pivoting securement of the motorcycle tie rod 116 above the sidecar body 102 and transfer of tilting forces from the motorcycle 168 to the arms 128, 130 via the tie rod 116.

In some embodiments, the pivoting axis of a tilting sidecar frame can extend through a pinned connection that joins the tilting sidecar frame to the relevant sidecar frame. For example, a pivoting axis 172 of the tilting sidecar frame 114 (see FIG. 2) extends front to back along the sidecar 100. Accordingly, for example, the tilting sidecar frame 114 can rotate, relative to the (fixed) sidecar frame 104 about the axis 172 (e.g., to the left or right from the perspective of a sidecar rider).

A generally lower portion of the tilting sidecar frame 114 extends below the body of the tilting sidecar frame 114, and is coupled to the sidecar tie rod 118 via a pinned connection 132 (see FIG. 2). For example, a cam plate (not shown) can extend from a main portion of the sidecar frame 114 at a pinned connection to the (fixed) sidecar frame 104, to support the pinned connection 132. The sidecar tie rod 118 extends away from the pinned connection 132 to be received through an aperture 134 within the sidecar frame 104 (see FIG. 1), with an end of the tie rod 118 opposite the pinned connection 132 being coupled to the cam plate 122 (see FIG. 1) via a pinned connection 136. Similarly to the pinned connections 124, 126, the pinned connections 132, 136 allow rotational movement about respective, generally parallel axes (e.g., the pinned connections 132, 136 allow for rotational movement into and out of the page of a connected element, with respect to the view in FIG. 1).

With the illustrated arrangement, as also described below, tilting movement at the motorcycle 168 can be reliably mechanically transferred into corresponding tilting movement of the tilting sidecar frame 114. In other embodiments, however, other configurations are possible. For example, in some embodiments, differently configured tie rods, tilting frames, or other components can be used to cause the tilting sidecar frame 114 to tilt generally in parallel (or otherwise) with the motorcycle 168.

In some embodiments, the tilting frame of a sidecar (or other components) can be configured to interoperate with a tilting suspension system, such as may be useful to allow a wheel of the relevant sidecar also to tilt generally in parallel (or otherwise) with the motorcycle. As noted above, for example, the sidecar 100 has the suspension system 108, which includes the previously described cam plate 122, and also includes a support frame 138, a trailing link 140, shock absorbers 142, 144, a pinned joint 146, a pivoting joint 148, a pivot plate 150, and a pinned connection 152.

The support frame 138 generally provides a structural support for the wheel 110 and for the suspension system 108 as a whole, as well as mounting locations for certain components, including as discussed below. In some embodiments, a support frame can also surround and protect the sidecar wheel. For example, the support frame 138 is configured as a fender, as is depicted in FIG. 1 in particular. However, in other embodiments, a support frame can exhibit other shapes, structures, and purposes.

In the illustrated embodiment, the cam plate 122 is mechanically fixed (e.g., via welding, fasteners, etc.) to a leading end of the support frame 138, and the pivot plate 150 is mechanically fixed (e.g., via welding, fasteners, etc.) to the trailing end of the support frame 138 (e.g., the end opposite the cam plate 122). The support frame 138 also supports an end of each of the shock absorbers 142, 144, and a portion of the pivoting joint 148.

In the illustrated embodiment, the pivoting joint 148 is configured as a ball joint, with a pivoting (e.g., spherical) portion fastened to the cam plate 122 above the pinned connection 136. The corresponding socket portion of the pivoting joint 148 is fixed to an upward extension 154 of the (fixed) sidecar frame 104. In this way, for example, the cam plate 122 and the suspension system 108 generally can move at the pivoting joint 148 with significant freedom relative to the sidecar frame 104. In other embodiments, however, other configurations are possible, including single-pin pivoting joints or other movable connections.

Opposite the pivoting joint 148, the pivot plate 150 is pivotally coupled to the pinned connection 152, which includes a pin 153 that is received through an end of a linking bar 156. Similarly, an opposing end of the linking bar 156 (e.g., the end opposite to where the pin 153 is received) receives another pin 158 of the pinned connection 152. The pin 158, in turn, is secured to a downward extension of the sidecar frame 104 and which is received through the opposing end of the linking bar 156, to pivotally secure the linking bar 156 to the sidecar frame 104. The combination of the linking bar 156, and the pins 153, 158, allow an end of the support frame 138 (e.g., via the pivot plate 150) to be pivotally coupled to the sidecar frame 104.

Although FIG. 1 illustrates two pins 153, 158 in the pinned connection 152, in other embodiments other configurations are possible. For example, a single-pinned joint, a ball joint, or another configuration may appropriately pivotally couple a support frame to the sidecar frame. Likewise, although the upper pin 153 is horizontally aligned with the pivoting joint 148 (as also discussed below), other configurations are possible.

In some embodiments, dual-pinned connections for sidecar suspensions, including the pinned connection 152, can have advantages over single pinned connections (e.g., connections that pivot only about a single pin that is fixed to a sidecar frame). For example, a dual pinned connection can allow the sidecar wheel to move with an additional degree (or degrees) of freedom as compared to conventional arrangements, which can allow for more accurate alignment of the sidecar wheel and associated components during turns. For example, in the illustrated embodiment, the two pins 153, 158 of the pinned connection 152 (see FIG. 1) can allow the rear end of the support frame 138 to move laterally relative to the fixed sidecar frame 104. Accordingly, the sidecar wheel 110 can generally pivot about an axis that is substantially perpendicular to the axis 176 (see FIG. 2). In this regard, for example, a dual-pinned connection (e.g., the pinned connection 152), and a multi-axis joint (e.g., the pivoting ball joint 148), can enable the rear end of a sidecar wheel to effectively swing rightward or leftward relative to the view in FIG. 2. Thus, the sidecar wheel can pivot, such that an associated pivot axis (e.g., the axis 176) deviates from a main tilt axis of the sidecar or the motorcycle (e.g., the generally parallel axes 170, 172).

Notably, this arrangement can allow the sidecar wheel to exhibit a turning radius that is different than the turning radius of the motorcycle. Due to the lateral offset of the sidecar wheel relative the motorcycle wheel, the turning radius of the motorcycle for a given turn will be different than the natural turning radius the sidecar wheel. However, because the sidecar wheel in some embodiments of the invention can pivot relative to multiple axes, as discussed above, the sidecar wheel can follow its own turning radius, independent from the turning radius of the motorcycle. This may be advantageous as compared to conventional configurations, for which a sidecar wheel may be forced to exhibit a turn radius that is the same as the turn radius of the motorcycle. This conventional arrangement, for example, can cause undesirable mechanical strain on axles or other sidecar components (e.g., due to misaligned natural and actual turning radii) as well as tire scrub or other adverse effects.

In some embodiments, certain components can help to limit a degree of pivoting of a sidecar suspension system. For example, as illustrated in FIGS. 1 and 2 in particular, mechanical stops 178, 180, configured as rigid pins, are secured to the support frame 138, and specifically secured to the pivot plate 150, near the pinned connection 152. However, in alternative embodiments, one or more mechanical stops can be secured to the sidecar frame 104. Each of the mechanical stops 178, 180, is configured to mechanically limit the maximum degree of pivoting of the sidecar wheel 110, where the pivoting corresponds to the deviation of axis 176 relative to axis 172, as discussed above. For example, the sidecar wheel 110 is prevented from pivoting beyond a certain degree, when the linking bar 156 contacts either of the mechanical stops 178, 180, depending on the pivoting direction. Thus, the location, size, and shape of the mechanical stops 178, 180, and the linking bar 156, determine the maximum degree of deviation the axis 176 is permitted to pivot relative the axis 172 (e.g., with the axes 172, 176 residing in the same plane). As such, in some embodiments, the pivoting limit of the sidecar wheel can be customized to set the desired pivoting limits. For example, depending on the needs of a particular rider or machine, the mechanical stops 178, 180 and the linking bar 156 can be configured such that the sidecar wheel 110 cannot pivot beyond ±15 degrees, ±20 degrees, ±25 degrees, or otherwise, relative to the axis 172.

In some embodiments, the mechanical stops 178, 180 can be advantageous when a user is performing maintenance with the sidecar raised off of the ground, as the stops 178, 180 can prevent the sidecar wheel 110 from pivoting beyond a certain amount. This can allow the user to easily access certain components of the sidecar and help to prevent undesired contact between components (e.g., the support frame 138 and the sidecar body 102). In some embodiments, the mechanical stops 178, 180 can usefully help to limit the pivoting of sidecar wheel beyond a certain amount when the sidecar 100 moves in reverse.

Figure 4:
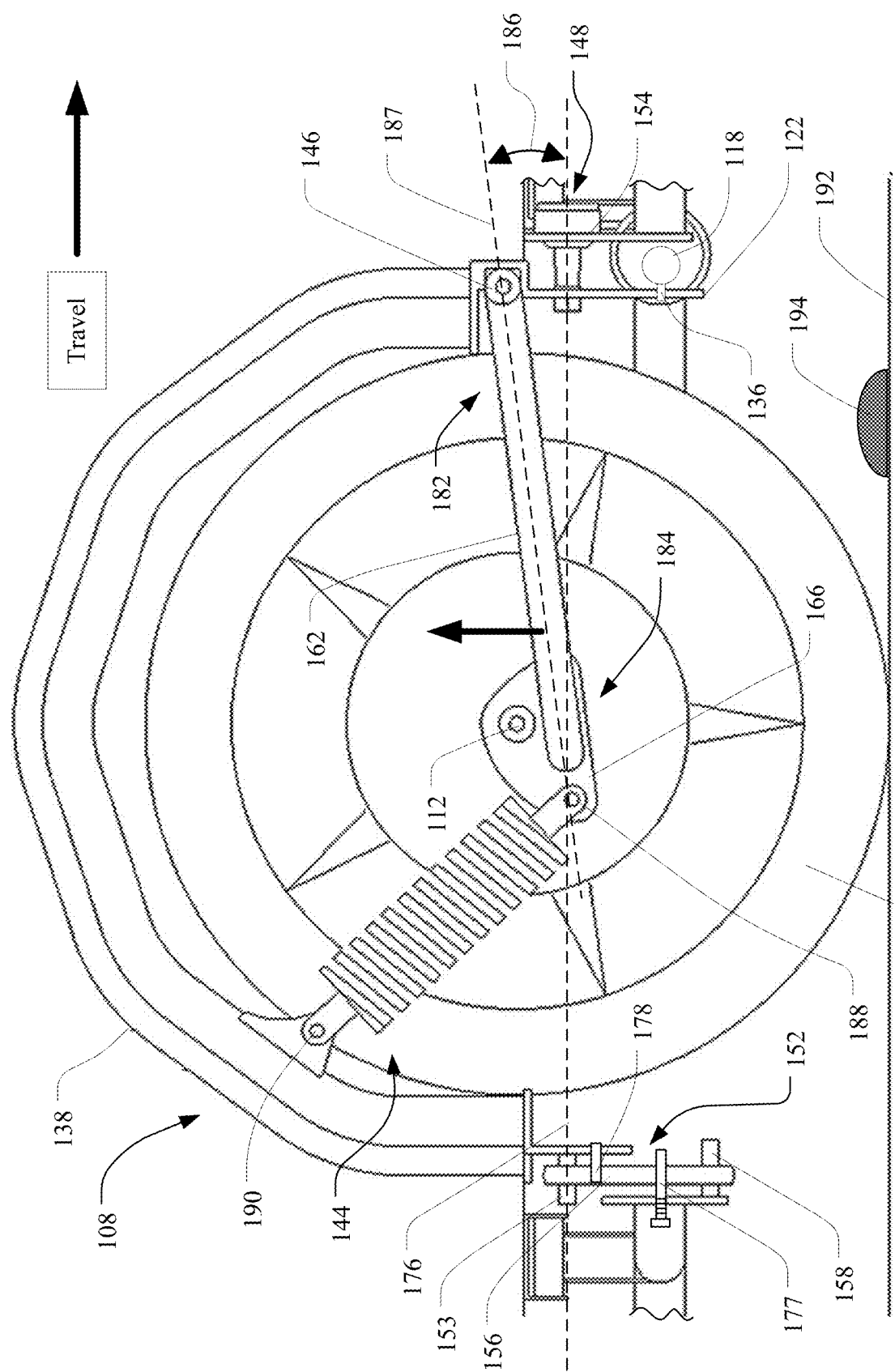
FIG. 4 is a side view of the suspension system of FIG. 1.

In some embodiments, a removable stop can be provided to selectively prevent (or otherwise restrict) movement of a sidecar wheel. For example, as illustrated in FIGS. 1 and 4 in particular, the sidecar 100 includes a removable pin 177 that can be received through the sidecar frame 104. With the pin 177 appropriately secured to the sidecar frame 104, the linking bar 156 contacts the pin 177, such that the pin 177 substantially prevents any tilting of the sidecar wheel 110. This functionality can be desirable, for example, when rolling the sidecar 100 backwards a relatively long distance (e.g., out of the garage or parking stall, off of a trailer, etc.). As appropriate (e.g., when backwards rolling is completed), the pin 177 can then be removed to restore the pivoting ability of the sidecar wheel 110.

In some embodiments, the pin 177 can be partially threaded, and the corresponding opening (e.g., slot) within the sidecar frame 104 can also be threaded. This can allow the pin 177 to be easily inserted (e.g., without rotation), then appropriately secured when the threaded portion of the pin 177 coincides with threaded portion within the aperture of the sidecar frame 104. In some embodiments, the pin 177 can be received in a bore through the linking bar 156, or can be received through a bore through the pivot plate 150 (see FIG. 1). In some embodiments, multiple removable pins, such as two pins structured similarly to the pin 177, can be received through the sidecar frame 104 to extend on opposite sides of the linking bar 156, such that each pin prevents movement of the linking bar 156 in a respective direction.

As noted above, the suspension system 108 includes the trailing link 140, shock absorbers 142, 144, and the pinned joint 146, aspects of which are particularly clearly shown in FIG. 2. Due to the perspective of FIG. 2, certain components of the sidecar 100 are hidden from view. For example, the pinned connection 132 is located below the tilting sidecar frame 114 from the perspective of FIG. 2. Further, certain components are illustrated schematically, to facilitate clear presentation and understanding of certain aspects of the embodiment.

Generally, trailing links according to the invention can trail behind pivoting connections to support sidecar wheels and other components with a somewhat free-floating configuration. In the illustrated embodiment in particular, as discussed above, the suspension system 108 includes the pinned joint 146, which pivotally secures a front (e.g., leading) portion of the trailing link 140 to a front end of the support frame 138 (e.g., the end of the support frame 138 that is connected to the cam plate 122). Also in the illustrated embodiment, the trailing link 140 includes two trailing arms: a first trailing arm 160 that extends alongside a first side of the sidecar wheel 110 and a second trailing arm 162 that extends alongside a second side of the sidecar wheel 110, opposite the first side of the sidecar wheel 110. In other embodiments, however, other configurations are possible.

Figure 3:
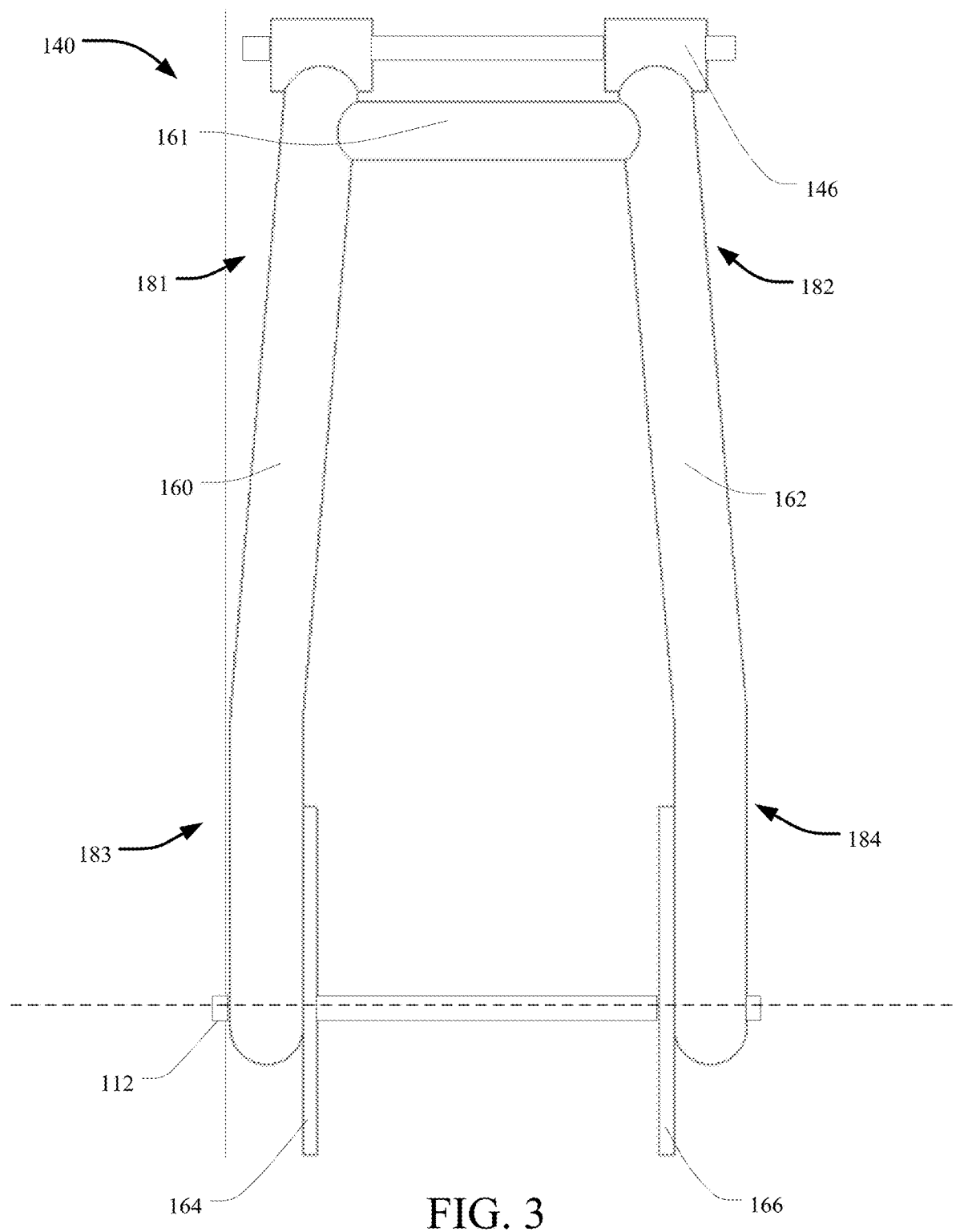
FIG. 3 is a top view of a trailing link of the suspension system of FIG. 1.

The first trailing arm 160 and the second trailing arm 162 of the trailing link 140 each have a corresponding trailing end and a leading end. For example, the first trailing arm 160 includes a leading end 181 and a trailing end 183. Similarly, the second trailing arm 162 includes a leading end 182 and a trailing end 184. Each of the leading ends 181, 182, are configured to receive the pinned joint 146, while each of the trailing ends 183,184, are configured to be coupled to the respective mounting plates. Additionally, when assembled, including the sidecar wheel 110, each of the trailing ends 183,184, are configured to trail behind the respective leading end 181, 182, when the sidecar travels in a forward direction (e.g., upward from the perspective of FIG. 2). In some embodiments, and as illustrated in FIG. 3 in particular, a bar 161 can mechanically couple each of the leading ends 181, 182, together. This can provide increased structural integrity for the trailing link 140.

Although the trailing link 140 is illustrated with both the first trailing arm 160 and the second trailing arm 162, a different number of trailing arms can be provided in other embodiments. For example, in order to more easily convert prior sidecar systems that have a single-side mounted sidecar wheel, a pinned joint (e.g., similar to the pinned joint 146) can be configured to couple a single-arm trailing link (e.g., similar to the second trailing arm 162) to a sidecar frame or other structure. Although such a single-arm configuration for a trailing link may allow for only a single side of the relevant sidecar wheel to be directly supported, a trailing-link arrangement can still provide advantages over conventional arrangements (e.g., as also discussed below).

As also illustrated in FIG. 3, the trailing ends 183, 184 of each of the first and second arms 160, 162, are mechanically linked (e.g., via welding, fasteners, integral formation, etc.) to corresponding mounting plates 164, 166. Each of the mounting plates 164, 166 includes corresponding apertures that are configured to receive the sidecar axle 112. Thus, in the fully assembled form, the trailing link 140 supports the sidecar wheel 110 from both lateral sides thereof. This can be advantageous, for example, when compared to previous sidecar wheel mount configurations that can only provide support on a single side of the sidecar wheel. Accordingly, as also described above, embodiments of the invention including as illustrated in FIGS. 1 and 2 can help to decrease undesirable stresses and strains on the mechanical connections (e.g., fasteners, welds, etc.) as compared to conventional designs, thereby helping to increase the longevity of these and other components.

Each of the mounting plates 164, 166 also provide a location to mechanically couple (e.g., via pinned connections, as illustrated in FIG. 2) an end of each the corresponding shock absorbers 142, 144. The opposing ends of the shock absorbers 142, 144 (e.g., the ends opposite to the ends connected to the mounting plates) are connected to the rearward portion of the support frame 138. Accordingly, the shock absorbers 142, 144 can allow, but dampen, movement of the wheel 110 relative to the support frame 138.

In the illustrated embodiment, as previously described, the arms 160, 162 of the trailing link 140 beneficially support and secure opposing sides of the sidecar wheel 110. The illustrated arrangement also allows for the securement of separate shock absorbers on each side of the sidecar wheel 110 (e.g., the shock absorbers 142, 144). This can also be advantageous as compared to conventional designs. For example, the spatial requirements for the shock absorbers 142, 144 can be significantly reduced when compared to typical, single-side mounted sidecar wheels that require fairly large mechanical dampers to compensate for being mounted on only one side of the sidecar wheel. Further, and relating to the advantage noted above, the more efficient utilization of space for shock absorbers on the sidecar 100 can allow the shock absorbers 142, 144 to be collectively configured to provide combined mechanical damping that is greater than a single-side mounted mechanical damper, while potentially requiring an overall smaller spatial envelope.

In different embodiments, different shock-absorbing devices can be used. For example, each of the shock absorbers 142, 144 is shown as having a spring and a dashpot. However, in other embodiments, other mechanical (or other) damping components known in the art can be added or substituted.

As the individual components of the sidecar 100 have been described above, the functionality of the components together can be more easily understood. As an example, FIG. 2 illustrates operation of the tilting system 106 when a motorcycle 168 undergoes leftward tilting (e.g., relative to the view in FIG. 2). Although the motorcycle 168 is schematically depicted as a "block" in FIG. 2, it will be appreciated by those of skill in the art that the tilting system 106 can generally engage the motorcycle 168 at, and be driven by, one or more of a variety of components. Generally, the tilting system 106 allows the sidecar wheel 110 to tilt in the same direction as the motorcycle, and in some cases, forces the sidecar wheel 110 to tilt the same amount as the motorcycle 168 (e.g., the same degrees of rotation relative to a horizontal pivoting axis). Thus, in other embodiments, different combinations of components could be used to achieve the same functionality as the tilting system 106 and, as such, the tilting system 106 is shown and described only as an example.

When the motorcycle 168 tilts to the left (e.g., when turning), as indicated by the counterclockwise directional arrow in FIG. 2, the pinned connection 124 also moves to the left. This forces the motorcycle tie rod 116 to also move (e.g., translate) leftward, as indicated by the leftward pointing arrow in FIG. 2. Correspondingly, the tie rod 116 pulls the plate 120 (see FIG. 1) leftward, because the plate 120 is pivotally coupled to the motorcycle tie rod 116, which effectively causes the tilting sidecar frame 114 to also tilt to the left, about the tilting axis of the tilting sidecar frame 114 (e.g., where the tilting sidecar frame 114 is pivotally coupled to the sidecar frame 104).

Due to the connection provided by the motorcycle tie rod 116, a given degree of rotation of the motorcycle 168 (e.g., about an axis 170), can force the tilting sidecar frame 114 to tilt in the same direction with the same degree of rotation (e.g., about the axis 172, substantially parallel to the axis 170). For example, when the motorcycle 168 tilts 10 degrees leftward about the axis 170, the tilting sidecar fame 114 also tilts 10 degrees leftward about the axis 172. In other configurations, however, the given degree of rotation of the motorcycle 168 about the axis 170 can be less than, or greater than the corresponding degree of rotation of the tilting sidecar frame 114 (e.g., via adjustment in tolerances of cam-plate dimensions, additions of slots, etc.).

In some embodiments, other advantages can also be obtained. For example, in the illustrated embodiment, a sidecar seat 174 is mechanically linked to and supported by the tilting sidecar frame 114. Thus, when the tilting sidecar frame 114 rotates, the sidecar seat 174 also rotates along with the tilting sidecar frame 114. This can be advantageous, as compared to conventional sidecar systems, as a passenger seated on the sidecar seat 174 can experience a similar riding experience as if seated on the motorcycle 168. Further, in some scenarios, this configuration can be safer as the sidecar passenger's movement may generally track the movement of the driver and of the motorcycle 168 generally.

As previously described, the tilting sidecar frame 114 generally follows tilting of the motorcycle 168. Further, when the tilting frame 114 tilts, the pinned connection 132 (e.g., which may include a cam plate) also tilts, in the same rotational but different lateral direction, due to the pinned connection 132 being positioned below the pivoting axis of the tilting sidecar frame 114. Due to the mechanical linking (e.g., pivotally coupling) of the sidecar tie rod 118 to the pinned connection 132, when rotation of the tilting frame 114 moves the pinned connection 132 rightward the sidecar tie rod 118 will move rightward as well. Further, because the sidecar tie rod 118 is coupled to the cam plate 122 and the pinned connection 152 and the sidecar tie rod 116 are positioned below the pivoting joint 148, the cam plate 122 will be correspondingly rotated in the same direction as the motorcycle 168. Simultaneously, the rotation of the cam plate 122, due to the cam plate 122 being pushed rightward by the sidecar tie rod 118 causes the support frame 138, along with the sidecar wheel 110, to pivot about the pivoting joint 148, as indicated by the rotational arrow in FIG. 2.

Thus, similarly to the tilting sidecar frame 114, the sidecar wheel 110 (and the associated suspension system) can also rotate in the same direction and with generally the same degree of rotation (e.g., about axis 176) as the tilting sidecar frame 114. However, in other embodiments, a sidecar wheel may tilt less than, or more than, a tilting sidecar frame or motorcycle.

In the discussion above, leftward tilting of the motorcycle 168 is described in particular. Similar functionality is also provided for rightward tilting. For example, as the motorcycle 168 tilts to the right, the motorcycle tie rod 116 is pushed rightward, forcing the tilting sidecar frame 114 to also tilt to the right, about the pivoting axis of the tilting sidecar frame 114. This forces the sidecar tie rod 118 to be pulled leftward, due to the pivotal connection of the sidecar tie rod 118 to the tilting sidecar frame 114 being located below the pivoting axis of the tilting sidecar frame 114. When the sidecar tie rod 118 moves leftward, the cam plate 122 is pulled towards the motorcycle 168, and accordingly rotates about the pivoting joint 148 to tilt the sidecar wheel 110 (and the suspension system generally) to tilt in the same direction as the motorcycle 168.

In some embodiments, certain components can help to limit a degree of tilting of a sidecar suspension system (e.g., including the sidecar wheel 110). For example, rigid pins or other mechanical stops (not shown), which are affixed to the fixed sidecar frame 104 or to the tilting sidecar frame 114 can limit the maximum degree of tilting of the sidecar wheel, via contact between the stops on both frames 104, 114 or between a stop and the opposing frame 104, 114. In some embodiments, the structure and location of components within the sidecar 100 (e.g., mechanical stops) can be customized to control the specific tilting limits of the sidecar wheel. For example, the general structure/shape of the sidecar tilting frame 114 and the sidecar frame 104 can determine a permitted tilting range (e.g., via contact locations), which can be, for example, ±15 degrees, ±20 degrees, ±25 degrees, or otherwise, relative to a resting vertical orientation. In some embodiments, a particularly useful tilting range can be ±20 degrees.

In some embodiments, particular geometric configurations of certain suspension components can provide substantial improvements over conventional arrangements, including with regard to trailing suspension links and other components. In this regard, for example, FIG. 4 shows an annotated side elevation view of the suspension system 108 of the sidecar 100. As previously discussed, the sidecar wheel 110 pivots about the axis 176, which is defined by and extends between the pivoting joint 148 and the pinned connection 152. In the illustrated configuration, the axle 112 of the sidecar wheel 110 is situated above the axis 176. This can be advantageous, for example, relative to ease of assembly of the suspension system 108. For example, the trailing end 184 of the second trailing arm 162 is mechanically linked (e.g., via welding) to the mounting plate 166. The axle 112 is then received through the relevant aperture of the mounting plate 166, allowing for the trailing end 184 of the trailing arm 162 to be positioned below the axle 112, thereby preventing the need to drill a bore through the trailing arm 162 to receive the axle 112. Further, loading of the axle 112 in vertical alignment with the body of the trailing arm 162 may result in more favorable stresses on the mounting plate 166 than may result from loading with alternative configurations (e.g., with the axle 112 cantilevered relative to the arm 162).

Additionally, the illustrated positioning of the trailing end 184 of the second trailing arm 162 below the axle 112 and of the pinned joint 146 can allow for advantageous angling of the trailing link 140. For example, in the illustrated example, the pivot axis of the trailing link 140, as defined by the pinned joint 146, is positioned above the pivot axis 176 of the suspension system 108 generally. From the pinned joint 148 to the trailing end 184, the trailing link 140 defines a reference line 187 which extends, in a "resting" configuration (e.g., with the sidecar wheel 110 under normal, static loading) at a positive angle 186 relative the axis 176. Further, the trailing link 140 correspondingly angles downwardly from the pinned joint 146 towards the trailing end 184.

A resting downward angle of a trailing link can be advantageous for a variety of reasons. For example, as the sidecar 100 travels in a forward direction as indicated in FIG. 5, the sidecar wheel 110 may contact contours in the road (e.g., bumps, divots, etc.), which can result in a net upward or downward force on the sidecar wheel 110. Due to the trailing configuration of the trailing link 140 and the rotational freedom at the pinned joint 146, when such a net force is imposed on the sidecar wheel 110, the trailing link 140 can accordingly readily pivot to move the sidecar wheel 110. Further, the initial downward angle of the trailing link 140 can dispose the suspension system 108 to convert impacts during forward travel into upward movement of the wheel 110 with particular efficiency. This can allow the sidecar wheel 110 to roll over obstacles relatively smoothly, as the rotation of the trailing link 140 compensates for height differences on the road. As an example, FIG. 4 shows a bump 194 on a road 192, which when contacting the sidecar wheel 110, will cause the trailing link 140, along with the sidecar wheel 110, to pivot upwardly about the pinned joint 146, thereby allowing the sidecar wheel 110 to roll relatively smoothly over the bump 194.

Other aspects of the illustrated configuration can also provide substantial benefits. For example, as illustrated in FIG. 4 in particular, a pinned connection 188 that pivotally couples a first end of the shock absorber 144 and the mounting plate 166 is located below and behind the sidecar axle 112, at the intersection of the reference line 187 and the pivot axis 176. This arrangement can result in particularly efficient and minimal-stress transfer of movement of the trailing link 140 into compression of the shock absorber 144.

In some embodiments, the angling of the shock absorber 144 can be selected to optimize damping of wheel movement by the suspension system 108. For example, a pinned connection 190 with the support frame 138 defines, in combination with the pinned connection 188, an angle of the shock absorber 144. This angle can be adjusted for particular designs via changes in the location of the pinned connections 188, 190 on the mounting plate 166 or the support frame 138. Accordingly, for example, response of a particular shock absorber can be optimized for particular contexts, sidecar designs, or other factors. For example, when the angle of the shock absorber 144 more closely aligns with the axis 176, the shock absorber 144 may tend to absorb less force that is perpendicularly directed relative to the axis 176. Conversely, when the angle of the shock absorber 144 is more closely aligned perpendicularly to the axis 176, the shock absorber 144 absorbs more force that is perpendicularly directed relative to the axis 176. In this regard, for example, the particular values of the angle 186 and of the angle of the shock absorber 144 can be optimized, in different embodiments, for particularly optimal interoperation.

The shock absorbers 142, 144 also can help the sidecar wheel 110 effectively roll over, or under, an obstacle. For example, the angling and properties (e.g., mechanical damping) of the shock absorbers 142, 144 determine the "absorbed" force when contacting the obstacle. If the obstacle is elevated (e.g., the bump 194), the shock absorbers 142, 144 can absorb a portion of the directed contact force by retracting (e.g., compressing). As the sidecar wheel 110 rotates upwardly about the pinned joint 146, the retracted (e.g., compressed) shock absorbers 142, 144 can simultaneously decompress, effectively forcing continued (or reestablished) contact between a surface of the sidecar wheel 110 and the elevated obstacle (e.g., the bump 194). This helps the sidecar wheel 110 to roll over the bump 194 with minimal disruption to the overall ride. The shock absorbers 142, 144 similarly function with regard to a divot in the road, as the shock absorbers 142, 144 force contact between the surface of the sidecar wheel 110 and the obstacle. Further, disposing the shock absorbers 142, 144 on opposing sides of the sidecar wheel 110 can help to better stabilize the sidecar wheel 110, as compared to conventional single-side supported sidecar wheels.

Although only a single side of the suspension system 108 has been described above in some discussion with regard to FIG. 4, the opposing side of the suspension system 108 is substantially identical in the illustrated embodiment. Thus, what has been previously described above with regard to the components on a single side of the suspension system 108 (e.g., the shock absorber 144, the first trailing arm 160, the mounting plate 166, and the pinned connections 188, 190), also pertain to the similar/corresponding components on the opposing side of the sidecar wheel 110.

Thus, embodiments of the inventions can provide an improved sidecar suspension system, and tilting systems for a sidecar wheel. In some embodiments, these systems allow a sidecar wheel, and portion of a sidecar frame, to pivot with the attached motorcycle. These systems also can allow a sidecar wheel to more easily overcome imperfections in the road.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. A suspension system for a sidecar of a motorcycle, the sidecar including a sidecar frame and a wheel with an axle, the suspension system comprising:
   a support frame pivotally secured to the sidecar frame;
   a trailing link pivotally secured to the support frame at a leading end of the trailing link, with a trailing end of the trailing link configured to trail behind the leading end of the trailing link relative to a direction of forward motion of the sidecar;
   a first shock absorber that extends between the trailing end of the trailing link and the support frame, the first shock absorber being configured to extend along a first side of the wheel; and
   a second shock absorber that extends between the trailing end of the trailing link and the support frame, the second shock absorber being configured to extend along a second side of the wheel that is opposite the first side, and
   the trailing end of the trailing link being configured to rotatably support the axle of the wheel.

2. The suspension system of claim 1, wherein the trailing link includes a first trailing arm configured to extend along a first side of the wheel and a second trailing arm configured to extend along a second side of the wheel, the first side being opposite the second side; and
   wherein the first and second trailing arms cooperatively support the axle on opposing sides of the wheel.

3. The suspension system of claim 1, wherein the trailing link includes a trailing arm, and a mounting plate that is secured to the trailing arm at the trailing end of the trailing link; and
   wherein the mounting plate is configured to secure the first shock absorber and the axle to the trailing link.

4. The suspension system of claim 1, with the sidecar further including a tie rod, wherein the support frame includes a cam plate, the cam plate being configured to be moved by the tie rod to tilt the support frame relative to the sidecar frame.

5. The suspension system of claim 4, wherein the support frame is pivotally secured to the sidecar frame at a pivoting joint; and
   wherein the trailing link is pivotally secured to the support frame opposite the pivoting joint from an engagement between the tie rod and the cam plate.

6. The suspension system of claim 1, wherein the support frame is pivotally secured to the sidecar frame at a front pivoting joint and a rear pivoting joint.

7. The suspension system of claim 6, wherein the support frame includes a fender for the wheel; and
   wherein the fender extends as a structural support for the wheel, being secured to the sidecar frame at the front pivoting joint and the rear pivoting joint.

8. The suspension system of claim 6, wherein the front pivoting joint is configured as a ball joint.

9. The suspension system of claim 8, wherein the trailing link is pivotally secured to the support frame at a pinned joint.

10. The suspension system of claim 6, wherein the rear pivoting joint includes a pivoting link.

11. The suspension system of claim 10, further comprising a mechanical stop configured to limit a pivot range of the pivoting link to limit a tilt range of the wheel.

12. A sidecar for a motorcycle, the sidecar comprising:
   a main sidecar frame;
   a wheel with an axle;
   a tilting sidecar frame pivotally secured to the main sidecar frame; and
   a suspension system that includes:
      a support frame pivotally secured to the main sidecar frame, the support frame including a fender that is pivotally secured to the tilting sidecar frame at a front pivoting joint and a rear pivoting joint, the fender extending as a structural support for the wheel of the sidecar, being secured to the sidecar frame at the front pivoting joint and the rear pivoting joint; and
      a trailing link pivotally secured to the support frame at a leading end of the trailing link, with a trailing end of the trailing link configured to trail behind the leading end of the trailing link relative to a direction of forward motion of the sidecar;
      the trailing end of the trailing link rotatably supporting the axle on opposing sides of the wheel;
      the suspension system being configured to tilt with the tilting sidecar frame to tilt the wheel.

13. The sidecar of claim 12, further comprising:
   a sidecar seat supported on the tilting sidecar frame;
   wherein the sidecar seat is configured to tilt with the tilting sidecar frame and the suspension system.

14. The sidecar of claim 12, wherein the support frame is pivotally secured to the main sidecar frame at a front pivoting joint and a rear pivoting joint;
   wherein the front pivoting joint includes a ball joint; and wherein the rear pivoting joint includes a pinned pivoting link.

15. The sidecar of claim 14, wherein a tilt axis of the suspension system extends from the ball joint to an upper pin of the pinned pivoting link.

16. The sidecar of claim 15, further comprising:
a tie rod extending between the tilting sidecar frame and a cam plate of the support frame; and
wherein a pivot axis of the tie rod at the cam plate is disposed at a larger height relative to ground than is a pivot axis at a lower pin of the pinned pivoting link.

17. The sidecar of claim 12, wherein the suspension system includes a shock absorber with a first end;
wherein the trailing link includes a trailing arm;
wherein the trailing arm is pivotally secured to the support frame at a front pivot;
wherein a rear end of the trailing link is configured to pivotally support the axle and the first end of the shock absorber; and
wherein the trailing arm is substantially aligned along a reference line that extends below the axle, between the first end of the shock absorber and the front pivot of the trailing arm.

18. A sidecar for a motorcycle, the sidecar comprising:
a main sidecar frame;
a wheel with an axle;
a tilting sidecar frame pivotally secured to the main sidecar frame; and
a suspension system that includes:
    a support frame pivotally secured to the main sidecar frame at a front pivoting joint and a rear pivoting joint, the front pivoting joint including a ball joint; and
    the rear pivoting joint including a pinned pivoting link; and
    a trailing link pivotally secured to the support frame at a leading end of the trailing link, with a trailing end of the trailing link configured to trail behind the leading end of the trailing link relative to a direction of forward motion of the sidecar;
    the trailing end of the trailing link rotatably supporting the axle on opposing sides of the wheel;
the suspension system being configured to tilt with the tilting sidecar frame to tilt the wheel.

19. The sidecar of claim 18, further comprising:
a suspension system that includes:
    a pinned joint coupled to the support frame;
    the trailing link having a first trailing arm coupled to a first mounting plate having an aperture therethrough, and a second trailing arm coupled to a second mounting plate having an aperture therethrough, wherein the first trailing arm of the trailing link is configured to extend along a first side of the wheel and the second trailing arm of the trailing link is configured to extend along a second side of the wheel, wherein the axle is configured to be received through the first and the second apertures, and wherein the trailing link is pivotally coupled to the pinned joint; and
    a first shock absorber coupled to the first mounting plate and the support frame, and a second shock absorber coupled to the second mounting plate and the support frame; and
a tilting system configured to tilt the wheel and the suspension system about an axis defined by the ball joint and the pinned pivoting link.

20. The sidecar of claim 18, wherein a tilt axis of the suspension system extends from the ball joint to an upper pin of the pinned pivoting link.

* * * * *